United States Patent [19]

Williamson

[11] 4,261,423
[45] Apr. 14, 1981

[54] FIELD CULTIVATOR SHANK

[75] Inventor: Gerald E. Williamson, Evansville, Ind.

[73] Assignee: Koehring Company, Brookfield, Wis.

[21] Appl. No.: 940,191

[22] Filed: Sep. 7, 1978

[51] Int. Cl.³ .............................................. A01B 35/24
[52] U.S. Cl. ................................... 172/705; 172/763; 403/137; 403/148; 267/177
[58] Field of Search .................... 403/166, 137, 148; 267/20, 8 R, 172, 173, 177, 175, 176, 174; 172/705, 708, 710

[56] References Cited

U.S. PATENT DOCUMENTS

| | | | |
|---|---|---|---|
| 2,490,237 | 12/1949 | Silver | 172/763 |
| 2,756,045 | 7/1956 | Savory | 267/8 R |
| 2,760,772 | 8/1956 | McIntyre | 267/20 R |
| 2,775,181 | 12/1956 | Zahn | |
| 2,850,956 | 9/1958 | Rogers | 172/265 |
| 3,098,529 | 7/1963 | Wade | 172/710 X |
| 3,258,076 | 11/1969 | Groenke | 172/705 |
| 3,461,973 | 8/1969 | Geurts | 172/705 |
| 3,480,086 | 11/1969 | Groenke | 172/710 |
| 3,493,055 | 2/1970 | Van Peursem | 172/708 |
| 3,700,038 | 10/1972 | Essex | 172/705 |
| 3,700,039 | 10/1972 | Essex | 172/705 |
| 3,782,481 | 1/1974 | Quanbeck | 172/710 |
| 3,825,073 | 7/1974 | Gardner | 172/710 |
| 3,981,367 | 9/1976 | Mydels | 172/705 |
| 4,011,916 | 3/1977 | Neal | 172/710 |

FOREIGN PATENT DOCUMENTS

| | | | |
|---|---|---|---|
| 594258 | 3/1960 | Canada | 172/705 |
| 194144 | 1/1908 | Fed. Rep. of Germany | 172/705 |
| 562011 | 8/1923 | France | 172/705 |
| 1129076 | 9/1956 | France | 172/705 |

OTHER PUBLICATIONS

Bush Hog Field Cultivators 12000 Series, published for Allied Products Corp., Selma, Ala., 1978.
Hiniker Field Cultivators 1975, Published for Hiniker Co., Mankato, Minn.
Assembly Drawing, Hiniker Press FN011, pp. 8, 9, Published for Hiniker Co., Mankato, Minn.
Brady 2500 Field Cultivators–Advertizing Brochure of Koehring Co., Appleton, Wisc.

*Primary Examiner*—Richard J. Johnson
*Attorney, Agent, or Firm*—Andrew J. Beck

[57] ABSTRACT

An earth working implement such as a field cultivator shank for use on a tool bar of a field cultivator includes a mounting bracket having an upper end and a lower end. The mounting bracket is secured at the lower end of the mounting bracket to the tool bar with the upper end of the mounting bracket extending rearwardly and upwardly of the tool bar. A spring shank is pivotably connected to the lower end of the mounting bracket at a first pivot point with the spring shank extending rearwardly and downwardly of the lower end of the mounting bracket. The spring shank terminates in a rounded end portion. A support bracket which securely engages an upper portion of the spring shank is pivotably connected to the mounting bracket and extends immediately beneath and alongside the spring shank for a portion of the spring shank length. A coil spring biases the spring shank downwardly away from the upper end of the mounting bracket. The coil spring is provided between the upper end of the mounting bracket and the rearward end of the support bracket. Pivotably attached to the upper end of the mounting bracket is an upper end of the coil spring. The mounting bracket preferably extends diagonally along the tool bar. An attachment clamp includes at least first and second flange ends having first and second finger portions which extend away from the attaching clamp so as to bias the attaching clamp away from the mounting bracket. A two position lever mechanism permits an adjustment of a pre-load compression of the coil spring.

13 Claims, 13 Drawing Figures

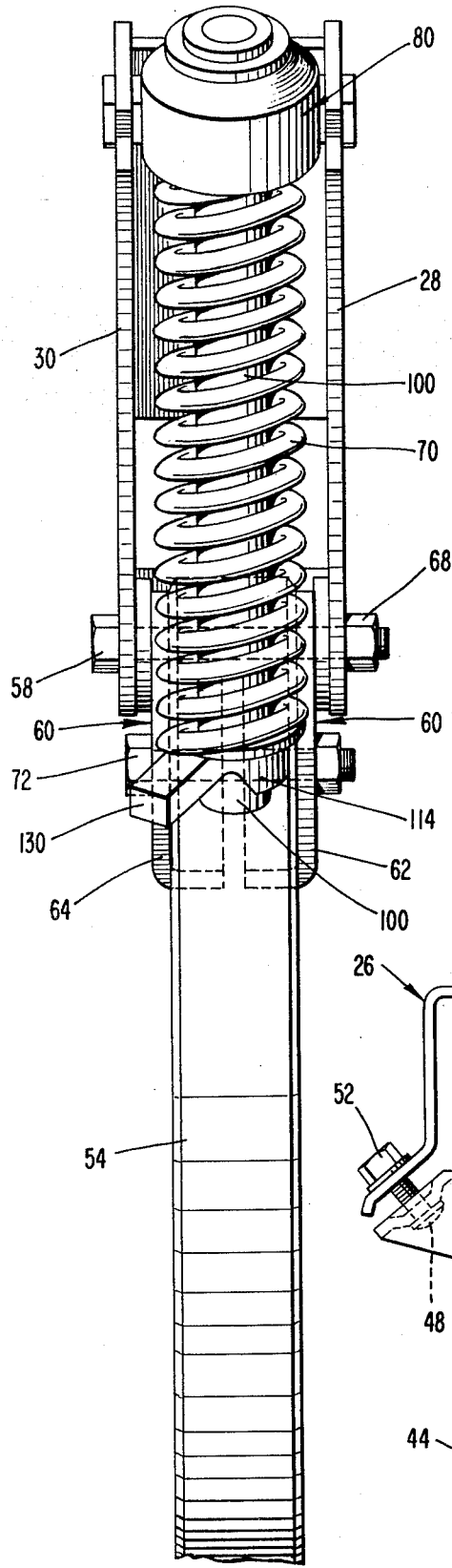
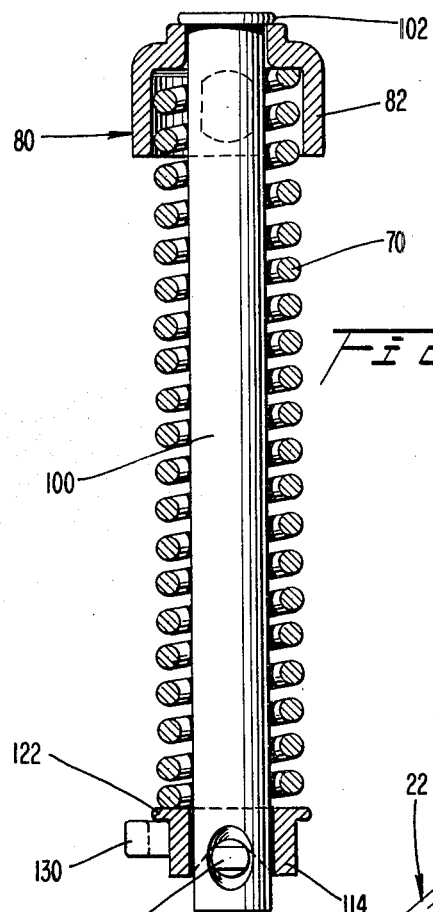
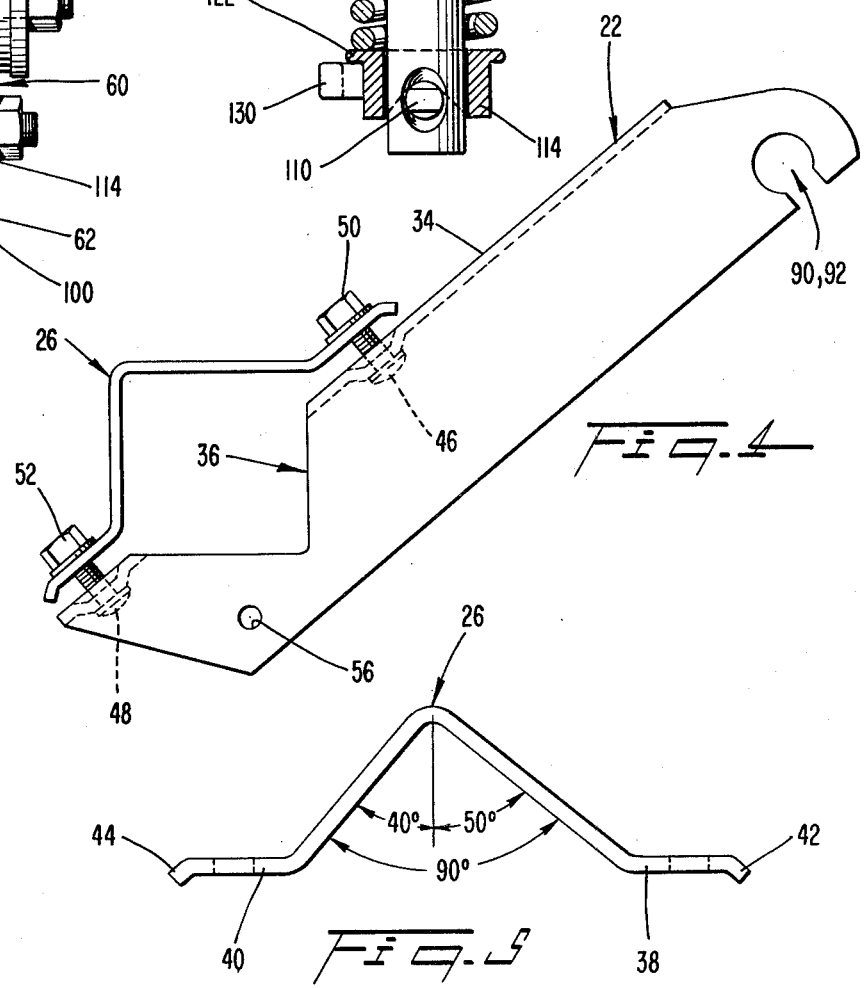
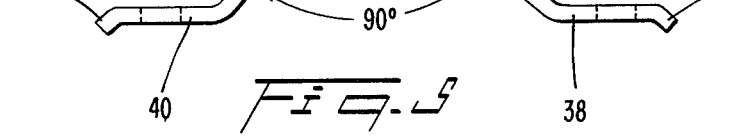

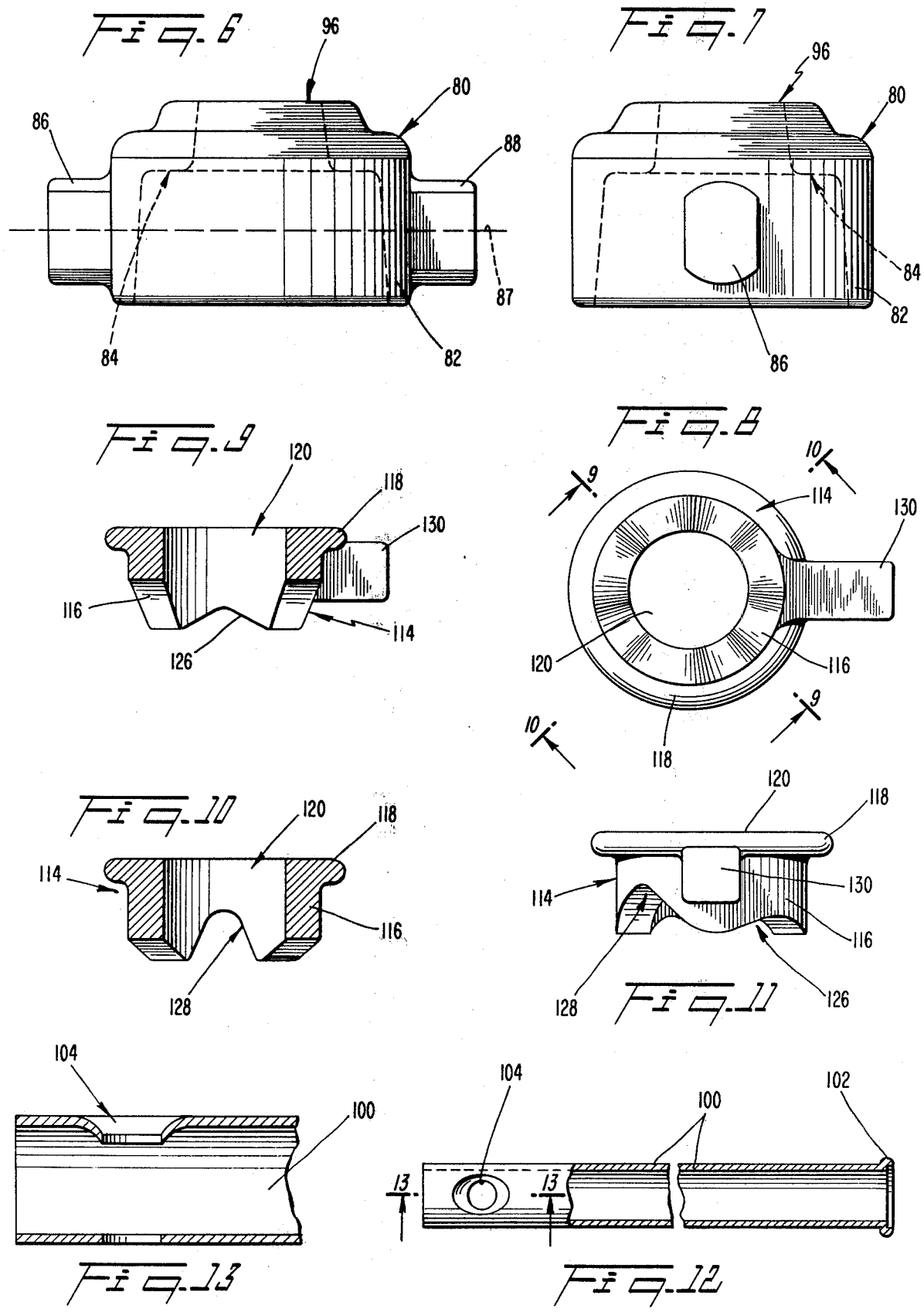

FIELD CULTIVATOR SHANK

BACKGROUND AND SUMMARY OF THE INVENTION

The present invention relates generally to earth working implements and more particularly relates to a field cultivator shank for use on a tool bar of a field cultivator.

field cultivator shanks are typically pivotably mounted to a tool bar by a mounting bracket so as to permit the field cultivator shank to pivot upwardly and over an immovable object such as a rock. Generally, a coil spring is utilized to provide a downward bias to restore the field cultivator shank to an original orientation after the immovable object has been overcome. A need still exists, however, to provide a field cultivator shank assembly having an improved ability to withstand side load forces and having an improved ability to move out of the way of immovable objects. One way to improve the ability of the spring shank assembly to move out of the way of immovable objects is to improve the obstacle clearance height through which the shank may travel.

A need also exists for an improved field cultivator shank assembly wherein side bending load forces incurred by the downward biasing coil spring at the top of the coil spring during compression are either greatly decreased or eliminated.

A spring trip shank assembly is known in which a downwardly biasing coil spring acts to restore a shank to a desired position after an obstacle has been encountered in a manner such as is disclosed in U.S. Pat. No. 3,700,039 issued to Essex et al. A mounting element extends diagonally with respect to a tool bar with the spring being attached at one end to the mounting bracket and at another end to a clamp disposed on the shank. The coil spring acts against an upper end of the mounting bracket and is not pivotably connected to the mounting bracket. Furthermore, the clamping member is carried by the spring shank and is not pivotably connected to the mounting bracket.

A mechanism for adjusting a pre-load spring bias of the coil spring in a spring trip shank assembly is disclosed in U.S. Pat. No. 3,700,038 issued to Essex. A clamp member which is carried by the shank may be reversed so as to vary the moment arm through which the spring force acts and to accordingly vary the force needed to pivot the shank upwardly.

Another spring trip cultivator shank assembly is known and is disclosed in U.S. Pat. No. 3,981,367 issued to Mydels wherein a downwardly biasing coil spring is mounted somewhat similarly to that of the Essex patents discussed above. The coil spring is received at a lower end by a U-shaped spring guide member which is disposed above the spring shank. A leaf spring is provided between a lower end of the mounting bracket and the U-shaped spring guide member and serves to maintain the spring shank in a desired position with respect to the mounting bracket.

Numerous spring shank assemblies have been disclosed wherein the mounting bracket which is attached to the tool bar extends either vertically or forwardly with respect to the tool bar. Examples of such field cultivator shank assemblies are provided in the following U.S. Pat. Nos. 3,258,076 issued to Groenke; 3,480,086 issued to Groenke; 3,098,529 issued to Wade et al; and 3,493,055 issued to Van Peursem.

It is an object of the present invention to provide a field cultivator shank assembly wherein a quick dismounting of the spring assembly is provided by a pivotal mounting between the spring assembly and the mounting bracket.

Another object of the present invention is to provide a field cultivator shank wherein an upper spring abutting surface is provided above a pivot center line of an end casting or tube member of the spring assembly so as to minimize wear of the casting or tube member as a result of contact with the mounting bracket.

Still another object of the present invention is to provide a field cultivator shank wherein an attachment clamp which secures the mounting bracket to the tool bar is provided with angular fingers to place the ends of the attachment clamp in compression rather than tension when assembly bolts are tightened.

Yet still another object of the present invention is to provide a field cultivator shank wherein a preload compression of the coil spring may be adjusted.

Still yet another object of the present invention is to provide a field cultivator shank wherein the preload compression force of the coil spring may be selectively adjusted between first and second preload compression forces by means of a two position lever mechanism.

An earth working implement such as a field cultivator shank for use on a tool bar of a field cultivator according to the present invention includes a mounting bracket having an upper end and a lower end. The mounting bracket is secured to a tool bar at the lower end of the mounting bracket by an attachment member so that the upper end of the mounting bracket extends rearwardly and upwardly of the tool bar. A spring shank is pivotably connected to a lower end of the mounting bracket at a first pivot point with the spring shank extending rearwardly and downwardly of the lower end of the mounting bracket and terminating in a rounded end portion. The spring shank is securely engaged at an upper portion by a support bracket which is pivotably connected to the mounting bracket and terminates at a rearward end.

A coil spring which biases the spring shank downwardly and away from the upper end of the mounting bracket has a generally cylindrical configuration and is provided between the upper end of the mounting brackets and the rearward end of the support bracket. During compression of the coil spring, a generally cylindrical configuration is maintained by a spring guide member which also limits the downward travel of the spring shank and the support bracket. The coil spring is pivotably mounted at an upper end of the mounting bracket by a spring pivotal mounting member. The mounting bracket may be attached to the tool bar by an attachment clamp having first and second flange ends provided with first and second finger portions respectively. The first and second finger portions extend away from the attachment clamp towards the mounting bracket whereby the first and second flange portions are biased away from the mounting bracket. The pre-load compression of the coil spring may be selectively adjusted by a two position lever member provided between the coil spring and the support brackets.

BRIEF DESCRIPTION OF THE DRAWINGS

The present invention will be more readily understood with reference to the accompanying drawings wherein like members bear like reference numerals and wherein:

FIG. 2 is an end view along line 2—2 of FIG. 1;

FIG. 3 is a side view of the spring assembly of the field cultivator shank of FIG. 1;

FIG. 4 is a side view of the mounting bracket and attachment clamp of the field cultivator shank assembly of FIG. 1;

FIG. 5 is an enlarged view of the attachment clamp of FIG. 4;

FIG. 6 is an enlarged end view of the spring end cap of FIG. 3;

FIG. 7 is an enlarged side view of the spring end cap of FIG. 3;

FIG. 8 is a top view of the two position lever member of FIG. 3;

FIG. 9 is a cross-sectional view along line 9—9 of FIG. 8;

FIG. 10 is a cross-sectional view along line 10—10 of FIG. 8;

FIG. 11 is a side view of the two position lever member of FIG. 3;

FIG. 12 is a side view of the spring guide member of FIG. 3; and,

FIG. 13 is a cross-sectional view along line 13—13 of FIG. 12.

DETAILED DESCRIPTION OF THE PRESENT INVENTION

Figure 1:
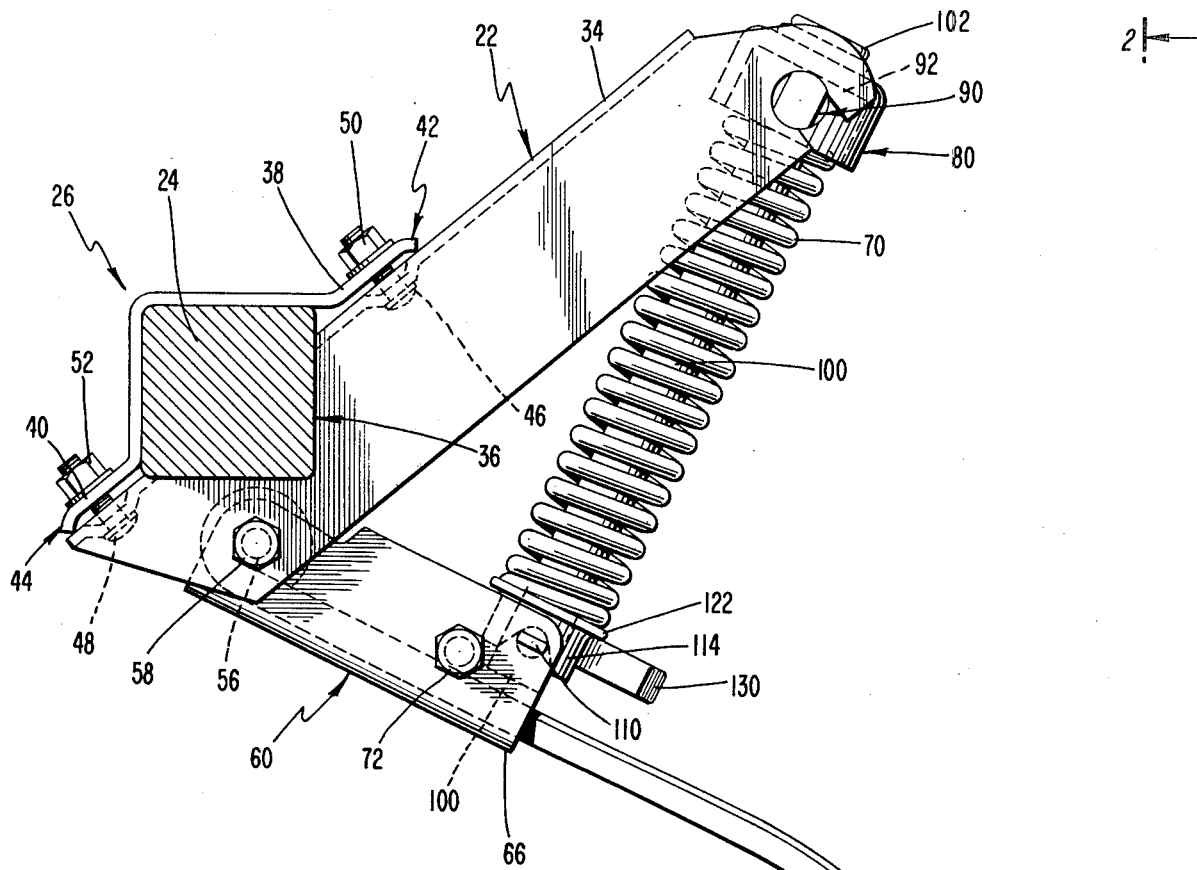
FIG. 1 is a side view of a field cultivator shank assembly according to the present invention.

With reference now to FIGS. 1 and 2 of the drawings, a mounting bracket 22 is secured to a conventional, rectangular tool bar 24 by an attachment clamp 26. With reference also to FIG. 4, the mounting bracket 22 is generally channel shaped and has side portions 28 and 30 which are joined together by a top portion 34. A notch 36 is cut into the mounting at a lower end of the mounting bracket to permit a proper orientation of the bracket 22 with the tool bar 24. The mounting bracket when secured to the tool bar 24 extends substantially diagonally with respect to the tool bar with an upper end of the mounting bracket extending rearwardly and upwardly with respect to the tool bar. The attachment clamp 26 includes an angularly shaped mid-portion which extends along a top portion and one side of the tool bar. The attachment clamp includes first and second flanges 38, 40 which are provided on either end of the angularly shaped portion. First and second finger portions 42, 44 are provided on each flange portion respectively. The finger portions extend away from the flange portion towards the top member of the mounting bracket. A pair of attachment bolts 46, 48 are inserted upwardly through corresponding holes in the mounting bracket and extend through first and second holes in the attachment clamp. A pair of attachment nuts 50, 52 are threadably received by the attachment bolts so as to urge the attachment clamp towards the mounting bracket. Engagement of the attachment clamp with the mounting bracket is initially obtained at the finger portions of the attachment clamp. Further tightening of the attachment nuts on the bolts causes the attachment clamp to be urged against the attachment nuts 50, 52. In this way, the attachment clamp is subject to a compressive force acting against the attachment bolts which helps to maintain the secure mounting of the mounting bracket on the tool bar, and to counteract a tensioning of the flange portions. The finger portions of the attachment clamp act similar to a lock washer to urge the portions of the clamp which are between the tool bar and the bolts towards the bracket 22 as the bolts are tightened. In this way, the compressive force resulting from the finger portions of the attachment clamp also biases each flange portion towards the nut of the respective bolt.

The attachment clamp is arranged so that the angularly shaped portion includes a 90° angle between interior face portions of the attachment clamp. The flange portions 38, 40 are arranged so that a perpendicular line extending upwardly from a plane including the flange portions does not bisect the angularly shaped portion into equal 45° angles. Instead, the perpendicular line divides the angularly shaped portion into a 40° angle and a 50° angle.

The notch 36 of the mounting bracket 22 is correspondingly arranged so that the mounting bracket when attached to the tool bar does not extend precisely diagonally with respect to the tool bar. Instead, the mounting bracket extends at an angle which is slightly below a true diagonal of the bool bar. In this way, the upper end of the mounting brackets is disposed at a lower position than if the mounting brackets were arranged precisely diagonally.

A spring shank 54 is pivotally attached to the mounting bracket at a pivot point 56. The spring shank terminates at its upper end in a curved portion which extends substantially around a pivot bolt 58. The spring shank is curved at its lower end so that the spring shank extends downwardly and forwardly so as to properly engage the soil. The spring shank 54 is substantially flat from a location immediately below the pivot point 56 to a point substantially behind a terminal end of a support bracket 60.

The spring shank may include a plurality of slots and holes (not illustrated) at a lowermost end of the spring shank. The pivot bolt 58 (see FIG. 2) threadably receives a pivot bolt nut 68 so as to maintain the pivot bolt in the mounting bracket 22.

Pivotably attached to the mounting bracket 22 at the first pivot point 56 is the support bracket 60. The pivot point 56 is located close to the tool bar 24 so that the side loading forces on the cultivator shank assembly are reduced. The support bracket 60 includes two separate portions (see FIG. 2) which together form a bracket that is substantially U shaped. The bracket 60 includes first and second side members 62, 64 which are joined together by a pair of flange portions 66. The bottom portion 66 extends substantially beneath the spring shank 54 from a location immediately forward of the first pivot point 56 to a location substantially beneath a coil spring 70.

So as to permit the mounting bracket 60 to move substantially adjacent to the tool bar 24 during an upward movement of the spring shank 54 the sides 62, 64 of the support bracket 60 are reduced in size in the vicinity of the pivot point 56. The support bracket 60 is securely attached to the spring shank 54 by the first pivot bolt 58 and by a second bolt 72 which is provided immediately ahead of the spring 70. The bolt 72 extends through the sides 64, 62 of the support bracket and maintains the support bracket in close engagement with the spring shank 54.

The coil spring 70 extends substantially from the upper end of the mounting bracket 22 to a terminal end portion of the support bracket 60. With reference also to FIGS. 6 and 7, an end cap or casting 80 is provided at an upper end of the coil spring 70. The end cap 80 includes a substantially cylindrical portion 82 which receives an upper end of the coil spring 70 on a shoulder portion 84. First and second pivot arms 86, 88 extend radially from the end cap 80 and are received within first and second slots of the mounting bracket 22.

The arms 86, 88 each include rounded portions and flat portions when viewed axially as in FIG. 7. The flat portions permit the arms to pass through a narrow portion of the slots 90, 92 (see FIG. 1) until the arms reach a rounded portion of the slots. Bearing surfaces of the arms 86, 88 are provided by the rounded portions which contact the rounded portions of the slots.

The slots 90, 92 of the mounting bracket extend substantially rearwardly and downwardly with respect to the mounting bracket. Received within the slots 90, 92 of the mounting bracket are the arms of the end cap 80 with the spring bias of the coil spring 70 helping to releasably maintain the pivot arms of the end cap within the slots. The end cap 80 may not be disengaged from the mounting bracket 22 until the lower end of the spring assembly has been disengaged from the support bracket and the spring assembly has been pivoted axially outwardly. After the flat portions of the arms 86, 88 have been aligned with the slots 90, 92, the end cap may be urged downwardly through the slots 90, 92 (see FIG. 1) of the mounting bracket to permit removal of the spring cap 80 from the mounting bracket. During normal operation, the pivotal mounting of the coil spring in the mounting bracket by the end cap 80 minimizes wear of the end cap casting and spring assembly as a result of contact with the mounting bracket 22.

With continued reference to FIGS. 6 and 7, the end cap 80 includes an axial bore 96 which extends through the end cap. A spring guide member 100, see FIGS. 12 and 13, is slidably receivable through the end cap 80 and through the coil spring 70. The spring guide member 100 has an outside cross-sectional diameter which is somewhat less than an interior diameter of the coil spring 70. In this way, the spring guide member 100 serves to maintain a generally cylindrical configuration for the coil spring 70 while at the same time not interfering with a normal compression of the coil spring.

A pivot line 87 extends axially through both of the arms 86, 88 with the spring assembly pivoting about the pivot line 87 at the uppermost portion of the spring assembly.

The spring guide member 100 includes a flange end 102 which has a diameter that is sufficient to prevent the spring guide member from passing completely through the end cap 80. In this way, the spring guide member 100 is free to travel upwardly through the end cap 80 but is restrained by the flange end 102 in a downward travel through the end cap 80. A lower end of the spring guide member 100 is provided with a pair of diametrically aligned holes 104.

During assembly of the spring shank assembly, the coil spring 70 is compressed axially so as to extend the lower end of the spring guide member 100 beyond the lowermost portion of the coil spring. A cross pin 110 sits in the diametrical depression or oblong slot of the spring guide member and extends through a corresponding bore on each side of the support member 60. In this way, the lowermost end of the spring guide member 100 is pivotally secured to the spring support member 80. The cross pin 110 also serves to maintain an appropriate spacing between the two portions of the support member 60.

With reference now to FIGS. 8 and 11, a two position lever member 114 includes a substantially cylindrical portion 116 includes an axial bore 120 (see FIG. 8) having an inside diameter which is sufficient to receive the spring guide member 100. The two position lever member 114 is provided immediately above the cross pin 110 and immediately beneath a lowermost portion of the coil spring 70 (see FIG. 1). A conventional washer 122 may be provided between the flange portion 120 of the two position lever member and the lowermost portion of the coil spring 70.

A lowermost portion of the cylindrical portion of the member 114 is provided with two pairs of downwardly extending notches. A pair of first notches 126 (see FIG. 9) extends only a short distance upwardly towards the flange portion 120 of the member 114. Extending substantially further upwardly towards the flange portion 120 is a second pair of notches 128 (see FIG. 11). The two notches 126, 128 are located substantially adjacent one another around a periphery of the cylindrical portion 116 with a bottom surface of the cylindrical portion being smooth and rounded between the adjacent notches.

A lever member 130 extends radially with respect to the cylindrical portion 116 and is located substantially between the adjacent notches 126, 128. When the two position lever member 114 is provided on the cross pin 110, the lever portion 130 extends substantially rearwardly of the mounting bracket 60 so as to permit an easy access to the lever member for adjusting the pre-load compression of the coil spring 70.

During operation and assembly of the field cultivator shank assembly, the mounting bracket is secured to the tool bar by the attachment clamp 26. The finger portions 42, 44 of the attachment clamp cause the flange portions of the attachment clamp to be subjected to compression forces rather than to tensioning forces upon a tightening of the attachment bolts.

The mounting bracket is arranged substantially diagonally with respect to the tool bar. Pivotably connected to a lower end of the mounting bracket 22 is the spring shank 54 which is engaged by a support bracket 60. The support bracket is pivotably carried by the mounting bracket and provides structural support for an upper portion of the spring shank 54.

A coil spring 70 provides a downwardly extending spring bias for the spring shank 54 and is pivotably connected to an upper end of the mounting bracket and to a terminal end of the support bracket. Compressed during assembly so as to provide a pre-load downward bias for the spring shank 54, the coil spring has a pre-load compressive force which also serves to maintain the end cap 80 of the coil spring in engagement with the upper end of the mounting bracket.

The end cap 80 is pivotably received with a pair of downwardly extending slots 90, 92. A spring guide member 100, provides structural support for the coil spring 70 and also serves to limit the maximum downward travel of the spring shank 54. When the spring shank 54 engages an immovable object, the spring shank is urged upwardly which tends to compress the coil spring 70 and simultaneously urge the spring guide member 100 upwardly through the end cap 80. The coil spring 70 freely pivots at both the upper and lower portion of the coil spring during the upward travel of the spring shank 54. Once the immovable object has been overcome, the spring shank is free to travel downwardly under the influence of the compression spring 70 until the spring guide member 100 again engages the end cap 80. During the downward travel of the spring shank 54, the coil spring 70 once again freely pivots at both the upper and lower portions of the coil spring.

A pre-load lever member is provided between the pivotal connection of the spring guide member and the lowermost portion of the coil spring. The pre-load lever member may be urged between a pair of notches so as to selectively vary the maximum length of the coil spring 70 during operation.

The maximum distance between the upper and lower pivot points of the spring assembly is determined by the length of the spring guide member 100 and especially is determined by the distance between the uppermost flange portion of the spring guide member and the location of the diametrically extending holes of the lower most portion of the spring guide member. By selectively positioning the pre-load lever member the maximum length of the coil spring between the pivot points is adjustably varied. Finally, the pivot arms of the end cap 80 are arranged beneath the interior shoulder of the cylindrical portion of the end cap which receives the uppermost end of the coil spring 70 so as to dispose the upper spring abutting surface above the pivot center line of the casting or end cap 80 to minimize wear of the end cap during normal operation.

The present invention has been described with respect to a preferred embodiment. It is to be understood that the form of embodiment of the invention which has been described above has been given by way of a purely indicative and in no way limiting example. Other modifications may readily be made by one skilled in the art without thereby departing from the scope of the invention.

What is claimed is:

1. An earth working implement, for use on a tool bar of a field cultivator, comprising:
   a mounting bracket having an upper end and a lower end;
   attachment means for securing the lower end of the mounting bracket to the tool bar, the upper end of the mounting bracket extending rearwardly and upwardly of the tool bar;
   a spring shank pivotably connected to the lower end of the mounting bracket at a first pivot point, the spring shank extending rearwardly and downwardly of the lower end of the mounting bracket and terminating in an end portion;
   a support bracket securely engaging an upper portion of the spring shank, the support bracket being pivotably connected to the mounting bracket at a first pivot point and terminating in a rearward end, the support bracket having a lower surface extending substantially beneath said upper portion of the spring shank and said support bracket also extending alongside said upper portion of the spring shank;
   a coil spring for biasing the spring shank downwardly away from the upper end of the mounting bracket, the coil spring having a generally cylindrical configuration and being provided between the upper end of the mounting bracket and the rearward end of the support bracket;
   means for pivotably connecting the coil spring to the rearward end of the support bracket at a second pivot point;
   spring guide means for maintaining the generally cylindrical configuration of the coil spring during compression of the spring and for limiting the downward travel of the spring shank and support bracket, said second pivot point of said rearward end of the support bracket being lower than said first pivot point when said spring shank and said support bracket are at a lower end of said limited downward travel of the spring shank and support bracket;
   spring pivotal mounting means for pivotably attaching an upper end of the coil spring to the upper end of the mounting bracket;
   means for adjusting a pre-load compression of the coil spring, the means for adjusting the pre-load compression of the coil spring including a two-position lever member provided between the coil spring and the support bracket.

2. The implement of claim 1, wherein
   the attachment means includes an attachment clamp extending at least partially around the tool bar and including at least first and second flange ends, the first and second flange ends including fastening means for securing the attachment clamp to the mounting bracket, the first and second flange ends having first and second finger portions extending away from the attachment clamp towards the mounting bracket whereby the first and second flange portions are biased away from the mounting bracket.

3. The implement of claim 1, wherein
   the mounting bracket extends substantially diagonally with respect to the tool bar.

4. The implement of claim 1, wherein
   the mounting bracket includes a pair of downwardly extending slots in the upper portion of the mounting bracket, with the spring pivotal mounting means being pivotably received in the pair of slots.

5. The implement of claim 4, wherein
   the spring pivotal mounting means includes an end cap member having a pair of radially extending arms, the arms being pivotably received in the downwardly extending slots of the mounting bracket.

6. The implement of claim 5, wherein
   the spring guide means includes a generally tubular spring guide member having a flange at an upper end of the guide member, the guide member being slidably received by the end cap member.

7. The implement of claim 6, further comprising:
   a cross pin, the spring guide member being pivotably connected to the support bracket by the cross pin which extends diametrically through the lower end of the spring guide member.

8. The implement of claim 5 wherein
   the radially extending arms of the end cap are arranged below an interior shoulder of the end cap which receives an uppermost end of the coil spring.

9. The implement of claim 1 wherein the support bracket includes first and second members which together are substantially U-shaped, each of said first and second members having side portions and flange portions, the side portions extending alongside said upper portion of the spring shank and the bottom flanges extending substantially beneath said upper portion of the spring shank.

10. The implement of claim 1, further comprising:
    a cross pin, the spring guide means including a spring guide member pivotably connected to the support bracket by the cross pin which extends diametrically through the lower end of the spring guide member, and wherein the two-position lever member releasably engages the cross pin.

11. An earth working implement, for use on a tool bar of a field cultivator, comprising;
   a mounting bracket having an upper end and a lower end;
   attachment means for securing the lower end of the mounting bracket to the tool bar, the upper end of the mounting bracket extending rearwardly and upwardly of the tool bar;
   a spring shank pivotably connected to the lower end of the mounting bracket at a first pivot point, the spring shank extending rearwardly and downwardly of the lower end of the mounting bracket and terminating in an end portion;
   a support bracket securely engaging an upper portion of the spring shank, the support bracket being pivotably connected to the mounting bracket and terminating in a rearward end;
   a coil spring for biasing the spring shank downwardly away from the upper end of the mounting bracket, the coil spring having a generally cylindrical configuration and being provided between the upper end of the mounting bracket and the rearward end of the support bracket;
   means for adjusting a pre-load compression of the coil spring while the earth working implement is assembled on the tool bar, said means for adjusting the pre-load compression of the coil spring including a two-position lever member provided adjacent the coil spring;
   spring guide means for maintaining the generally cylindrical configuraion of the coil spring during compression of the spring and for limiting the downward travel of the spring shank and support bracket; and
   spring pivotal mounting means for pivotably attaching an upper end of the coil spring to the upper end of the mounting bracket.

12. An earth working implement, for use on a tool bar of a field cultivator, comprising:
   a mounting bracket having an upper end and a lower end;
   attachment means for securing the lower end of the mounting bracket to the tool bar, the upper end of the mounting bracket extending rearwardly and upwardly of the tool bar;
   a spring shank pivotably connected to the lower end of the mounting bracket at a first pivot point, the spring shank extending rearwardly and downwardly of the lower end of the mounting bracket and terminating in an end portion;
   a support bracket securely engaging an upper portion of the spring shank, the support bracket being pivotably connected to the mounting bracket and terminating in a rearward end;
   a coil spring for biasing the spring shank downwardly away from the upper end of the mounting bracket, the coil spring having a generally cylindrical configuration and being provided between the upper end of the mounting bracket and the rearward end of the support bracket;
   spring guide means for maintaining the generally cylindrical configuration of the coil spring during compression of the spring and for limiting the downward travel of the spring shank and support bracket;
   spring pivotal mounting means for pivotably attaching an upper end of the coil spring to the upper end of the mounting bracket;
   means for adjusting a pre-load compression of the coil spring, including a two-position lever member provided between the coil spring and the support bracket; and
   a cross pin, the spring guide means including a spring guide member pivotably connected to the support bracket by the cross pin which extends diametrically through the lower end of the spring guide member, and wherein
   the two-position lever member releasably engages the cross pin.

13. An earth working implement, for use on a tool bar of a field cultivator, comprising:
   a mounting bracket having an upper end and a lower end;
   attachment means for securing the lower end of the mounting bracket to the tool bar, the upper end of the mounting bracket extending rearwardly and upwardly of the tool bar;
   a spring shank pivotably connected to the lower end of the mounting bracket at a first pivot point, the spring shank extending rearwardly and downwardly of the lower end of the mounting bracket and terminating in a rounded end portion;
   a support bracket securely engaging an upper portion of the spring shank, the support bracket being pivotably connected to the mounting bracket and terminating in a rearward end;
   a coil spring for biasing the spring shank downwardly away from the upper end of the mounting bracket, the coil spring having a generally cylindrical configuration and being provided between the upper end of the mounting bracket and the rearward end of the support bracket, the coil spring being operatively connected to an upper end of the mounting bracket;
   spring guide means for maintaining the generally cylindrical configuration of the coil spring during compression of the spring and for limiting the downward travel of the spring shank and support bracket, said spring guide means pivotably attaching the coil spring to the rearward end of the support bracket; and
   means for adjusting a pre-load compression of the coil spring while the coil spring is operatively attached to the mounting bracket and while the coil spring is pivotably attached to the rearward end of the support bracket by the spring guide means, said means for adjusting the pre-load compression including a two-position lever member provided between the coil spring and the support bracket.

* * * * *